(12) United States Patent
Reed

(10) Patent No.: US 10,626,020 B2
(45) Date of Patent: Apr. 21, 2020

(54) EXTRACTION OF LITHIUM FROM BRINE

(71) Applicant: INNEOVATION PTY LTD, West Perth, Western Australia (AU)

(72) Inventor: Christopher John Reed, Swanbourne (AU)

(73) Assignee: Inneovation Pty Ltd, West Perth (AU)

( * ) Notice: Subject to any disclaimer, the term of this patent is extended or adjusted under 35 U.S.C. 154(b) by 3 days.

(21) Appl. No.: 15/749,428

(22) PCT Filed: Aug. 5, 2016

(86) PCT No.: PCT/AU2016/050708
§ 371 (c)(1),
(2) Date: Jan. 31, 2018

(87) PCT Pub. No.: WO2017/020090
PCT Pub. Date: Feb. 9, 2017

(65) Prior Publication Data
US 2018/0222760 A1    Aug. 9, 2018

(30) Foreign Application Priority Data
Aug. 6, 2015 (AU) .............................. 2015903155

(51) Int. Cl.
| | | |
|---|---|---|
| *C01G 23/00* | (2006.01) | |
| *C01D 15/04* | (2006.01) | |
| *B01D 15/08* | (2006.01) | |
| *C01G 23/04* | (2006.01) | |
| *C01D 3/16* | (2006.01) | |
| *C22B 26/12* | (2006.01) | |
| *B01J 20/02* | (2006.01) | |
| *B01J 20/30* | (2006.01) | |
| *B01J 20/34* | (2006.01) | |

(52) U.S. Cl.
CPC ............ *C01D 15/04* (2013.01); *B01D 15/08* (2013.01); *B01J 20/0211* (2013.01); *B01J 20/3071* (2013.01); *B01J 20/3085* (2013.01); *B01J 20/3433* (2013.01); *B01J 20/3475* (2013.01); *C01D 3/16* (2013.01); *C01G 23/001* (2013.01); *C01G 23/003* (2013.01); *C01G 23/005* (2013.01); *C01G 23/04* (2013.01); *C22B 26/12* (2013.01); *C01P 2004/13* (2013.01); *C01P 2004/16* (2013.01)

(58) Field of Classification Search
CPC .............................. C22B 26/12; C01G 23/005
See application file for complete search history.

(56) References Cited

U.S. PATENT DOCUMENTS

2005/0263441 A1* 12/2005 Antonio ............... B01J 20/0211
                                                                 208/244

FOREIGN PATENT DOCUMENTS

| CN | 204162442 U | 2/2015 |
|---|---|---|
| JP | 02-004442 A | 1/1990 |

OTHER PUBLICATIONS

Shi, X. et al., Synthesis of Li+ adsorbent (H2TiO3) and its adsorption properties, Transactions of Nonferrous Metals Society of China, Jan. 2013, vol. 23, pp. 253-259, Section 1—Introduction on p. 253, section 3.2—Preparation & characterization of lithium adsorbent on pp. 255-256, and sub-section 3.3.4—including table 3 on p. 258.

* cited by examiner

*Primary Examiner* — Melissa S Swain
(74) *Attorney, Agent, or Firm* — Clements Bernard Walker; Christopher L. Bernard

(57) ABSTRACT

A process for the extraction of lithium from a brine, wherein a solution of the brine is contacted with a titanate adsorbent such that lithium ions are adsorbed thereon whilst rejecting substantially all other cations. The adsorbent is provided in the form of either a hydrated titanium dioxide or a sodium titanate. The process in turn produces a substantially pure lithium chloride solution.

15 Claims, No Drawings

EXTRACTION OF LITHIUM FROM BRINE

FIELD OF THE INVENTION

The present invention relates to a process for the extraction of lithium from a brine. More particularly, the lithium is extracted from the brine through adsorption on an adsorbent. Still more particularly, the adsorbent utilised in the process of the present invention is hydrated titanium dioxide, which in one form of the invention is produced from titanium dioxide.

The present invention further relates to a process for the purification of lithium chloride.

BACKGROUND ART

Lithium chloride (LiCl) has widespread commercial application. It is used in the production of lithium metal, lithium carbonate and lithium hydroxide monohydrate for various battery applications. Due to the requirement for high purity in many of these applications, particularly when used as a cathode material in lithium ion batteries, there is an ever increasing need for high purity lithium chloride.

Traditionally, LiCl from a brine source is purified by solar evaporation technology to concentrate the brine solution and thereby remove magnesium, sodium and potassium impurities. Other impurities, such as boron, may be removed by solvent extraction technology, whereas traces of calcium, magnesium and other similar impurities may be removed by increasing the pH of the brine solution and also through the addition of soda ash and the formation of insoluble calcium carbonate. This is very time consuming and highly dependent on the weather. Therefore, a purification means is needed to remove the majority of the impurities from a LiCl solution derived from a brine source, such that the concentration of each impurity is reduced to less than about 20 ppm.

An impurity concentration of less than about 20 ppm makes the resulting LiCl suitable for use in lithium metal extraction or the preparation of other lithium compounds, including lithium carbonate and lithium hydroxide monohydrate, for use in lithium ion battery applications.

The process of the present invention has as one object thereof to overcome substantially one or more of the above mentioned problems associated with the prior art, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The term brine, or brines, or variations thereof, is to be understood to include a solution of alkali and/or alkaline earth metal salt(s) in water, of a natural or possibly industrial source. The concentrations of the various salts can vary widely. The ions present in brine may include a combination of one or more of a monovalent cation, such as lithium, multivalent cations, monovalent anions, and multivalent anions.

The term high purity lithium chloride solution is to be understood, unless the context requires otherwise, as requiring any impurity present to be present in amounts of less than about 20 ppm.

Throughout the specification and claims, unless the context requires otherwise, the term titanate or titanate adsorbent, or variations thereof, are to be understood to include inorganic compounds composed of titanium oxides, particularly hydrated titanium dioxide, hydrogen titanate and sodium titanate.

DISCLOSURE OF THE INVENTION

In accordance with the present invention there is provided a process for the extraction of lithium from a brine, wherein a solution of the brine is contacted with a sodium titanate adsorbent, such that lithium ions are adsorbed thereon whilst rejecting substantially all other cations, the adsorbent being regenerated through the addition of a hydrochloric acid solution whilst the adsorbed lithium is extracted, the process thereby producing a substantially pure lithium chloride solution.

Preferably, the brine solution is unbuffered when contacted with the sodium titanate adsorbent.

The brine preferably contains impurities from the group of sodium, potassium, magnesium, calcium and borate.

Still preferably, the impurity concentration of the substantially pure lithium chloride solution does not exceed about 20 ppm.

In one form of the present invention the brine contains lithium in the range of about 500 to 1500 ppm, and impurities including magnesium in the range of about 0.15% to 0.30%, calcium in the range of about 0.05% to 0.1%, sodium in the range of about 8 to 10%, potassium in the range of about 0.7% to 1.0%, and borate in the range of about 0.15% to 0.20%.

In a more preferred form of the present invention, the brine contains about 700 ppm lithium, about 0.19% magnesium, about 0.09% calcium, about 8.8% sodium, about 0.8% potassium and about 0.18% borate.

The brine solution is preferably adjusted to a pH of 7 through the addition of a base. The base is preferably provided in the form of sodium hydroxide.

The contact between the brine solution and the adsorbent preferably takes place at or about room or ambient temperature.

In one form of the present invention the brine is collected into a vessel and cooled to room temperature prior to its exposure to the adsorbent. Preferably, room temperature is understood to be between about 20° C. to 28° C.

Preferably, the contact or residence time between the brine solution and the adsorbent is between about 4 to 24 hours.

Still preferably, the contact or residence time between the brine solution and the adsorbent is:
a. between about 8 to 24 hours;
b. between about 20 to 24 hours; or
c. between about 8 to 16 hours.

It is to be understood that the contact time is to some extent dependent upon additional variables including reactor size and shape.

Preferably, the amount of lithium extracted from the adsorbent through exposure to the acid solution is greater than about 90%. Still further preferably, the amount of lithium extracted from the adsorbent through exposure to the acid solution is about 100% of the adsorbed lithium.

One aspect of this invention provides a process to reduce or eliminate impurities in LiCl brine to concentrations acceptable for use in high purity applications such as lithium ion batteries.

In accordance with the present invention there is further provided an apparatus for the extraction of lithium from a brine, wherein a solution of the brine is contacted with an adsorbent such that lithium ions are adsorbed thereon whilst rejecting substantially all other cations.

BEST MODE(S) FOR CARRYING OUT THE INVENTION

The present invention provides a method for the extraction of Li from LiCl brine by using a titanate adsorbent, such as hydrated titanium dioxide ($H_2TiO_3$), hydrogen titanate ($H_2Ti_3O_7$) or sodium titanate ($Na_2Ti_3O_7$).

More broadly, the present invention provides a process for the extraction of lithium from a brine, wherein a solution of the brine is contacted with an adsorbent such that lithium ions are adsorbed thereon whilst rejecting substantially all other cations. The adsorbent is provided in the form of a titanate adsorbent. In one form this titanate adsorbent is a hydrated titanium dioxide that may, in one further form of the present invention, be produced from titanium dioxide.

The process of the present invention in turn produces a substantially pure lithium chloride solution. It is intended that the impurity concentration of the substantially pure lithium chloride solution does not exceed about 20 ppm.

In one form of the present invention the brine contains lithium in the range of about 500 to 1500 ppm, and impurities including magnesium in the range of about 0.15% to 0.30%, calcium in the range of about 0.05% to 0.1%, sodium in the range of about 8 to 10%, potassium in the range of about 0.7% to 1.0%, and borate in the range of about 0.15% to 0.20%. In one example, the brine contains about 700 ppm lithium, about 0.19% magnesium, about 0.09% calcium, about 8.8% sodium, about 0.8% potassium and about 0.18% borate.

The brine solution is adjusted to a pH of 7 through the addition of a base, for example sodium hydroxide, prior to its contact with the adsorbent. The contact between the brine solution and the adsorbent takes place at or about room or ambient temperature.

The brine may be collected into a vessel and cooled to room temperature prior to its exposure to the adsorbent. Room temperature is understood to be between about 20° C. to 28° C.

The contact or residence time between the brine solution and the adsorbent is between about 4 to 24 hours, for example 8 to 16 hours. However, the contact time between the brine solution and the adsorbent is understood to be dependent, to some extent, upon additional variables including reactor size and shape.

The adsorbent is regenerated through the addition of an acid solution and the adsorbed lithium is extracted to provide the high purity lithium chloride solution. The acid solution is, for example, a solution of hydrochloric acid.

The amount of lithium extracted from the adsorbent through exposure to the acid solution is greater than about 90%. Still further preferably, the amount of lithium extracted from the adsorbent through exposure to the acid solution is about 100% of the adsorbed lithium.

The present invention will now be described with reference to the following non-limiting examples.

Example 1

Hydrated titanium dioxide ($H_2TiO_3$) is, as noted above, a preferred form of the adsorbent used in the process of the present invention. Suitable hydrated titanium dioxide ($H_2TiO_3$) may be obtained in Australia from Alpha Chemicals, 18 Inman Road, Cromer, NSW, Australia 2099 (98% metatitanic acid, CAS No. 12026-28-7, ultimate supplier Alfa Chemistry, 1360 Stony Brook Rd, Stony Brook, N.Y., 11790, USA). The function of the adsorbent material in the process of the present invention, without being limited by theory, is to absorb lithium ions from the LiCl brine and thereby rejecting the impurities, including competing cations.

The adsorbent $H_2TiO_3$ used in this embodiment of the present invention may advantageously be placed in a column. Further, the adsorbent may be placed in a column and the brine solution may be directed through this column.

10 g of lithium containing brine was placed in a beaker and the pH adjusted to 7 through the addition of dilute NaOH. 0.20 g of the adsorbent $H_2TiO_3$ was packed in a vertical column. The brine contains about 700 ppm lithium, about 0.19% magnesium, about 0.09% calcium, about 8.8% sodium, about 0.8% potassium and about 0.18% borate.

The brine, after adjusting the pH, was passed through the vertical column and retained for 24 hours for complete adsorption of lithium in the adsorbent packed column. Following this, lithium adsorbed in the adsorbent was stripped from the adsorbent using a dilute HCl acid. The stripped solution was analysed for the concentration of lithium and all other impurities such as $Na^+$, $K^+$, $Ca^{2+}$, $Mg^{2+}$. Lithium was found to be extracted at nearly 100% whereas all other impurities were extracted at levels of less than 20 ppm.

The lithium adsorption from the brine was performed at different volume ratios of 1 mol $dm^{-3}$ NaOH, by dispersing 0.20 g of $H_2TiO_3$ in 10 $cm^3$ brine, and the suspension was shaken frequently over 24 hours at room temperature. The effect of a sample dose (g $dm^{-3}$) on the adsorption of lithium, sodium, potassium, magnesium and calcium from the brine containing 1 mol $dm^{-3}$ NaOH (volume ratio of NaOH–brine=0.12) was carried out by dispersing 0.10-0.50 g of $H_2TiO_3$ in 10 $cm^3$ of the brine.

Regeneration of the adsorbent $H_2TiO_3$: 1.0 g of the lithium adsorbed sample (32 mg $g^{-1}$) was treated with 100 $cm^3$ of 0.2 mol $dm^{-3}$ HCl solution for 24 hours at room temperature. Lithium was extracted completely (about 100%). To test the reusability of the regenerated sample, about 1.0 g of the acid treated material was treated with 50 $cm^3$ brine containing $NaHCO_3$ for 24 hours.

An appropriate apparatus to be used in carrying out the process of the present invention may be any manifold system whereby a lithium containing brine can be delivered to a column containing an adsorbent and then ultimately collected in a receiving vessel. The apparatus may also have a means for drawing aliquots of LiCl for analysis. Such means may be a sample port comprising a resilient septum affixed in line to the apparatus. The apparatus may be composed of various vessels such as glass flasks, ceramic containers, metal containers or other typical non-reactive chemical reaction vessels. The vessels may be connected using non-reactive polymeric tubing, metal pipe or tube, or glass pipe or tube. The apparatus may be sectioned off using any type of valve stopcock or clamp depending on the composition of the tubing or piping.

Example 2

Preparation of Hydrated Titanium Dioxide from Titanium Dioxide.

Sodium titanate (Na-titanate) nanotubes f nanofibers were prepared by a hydrothermal reaction between a concentrated NaOH solution and an inorganic titanium salt. Specifically, 3.0 g of $TiO_2$ powder was dispersed slowly into 80 mL of 10 M NaOH in a plastic beaker. The suspension was kept stirring for 1 hour, and then transferred into an autoclave with a polytetrafluoroethylene (PTFE) container inside. The autoclave was maintained at a specific hydrothermal temperature (150~220° C.) for 48 hours. A white precipitate was recovered by centrifugation and was washed 3 times with water. The resulting wet cake was then dispersed into 100 mL of 0.1 M HCl solution and stirred for 30 min. Then a solid was recovered by centrifugation. Finally, the sample was washed with water 3 times and then with ethanol twice. The washed solid was dried at 100° C. overnight and labelled as $Na_2Ti_3O_7$. The as-prepared samples were denoted as $Na_2Ti_3O_7X$ (X=hydrothermal temperature 150~220° C.).

Hydrogen titanate (H-titanate) was prepared by the treatment of Na-titanate with diluted HCl solution. Specifically, 2.0 g of Na-titanate was dispersed into 500 mL of 0.05 M HCl solution, and stirred for 1 hour at room temperature. This procedure was repeated 3 times in total to ensure most of the $Na^+$ was exchanged by $H^+$. The solid was then washed with 200 mL water by filtration to remove most of the sodium ions. The as-prepared samples were denoted as $H_2Ti_3O_7X$ (X=hydrothermal temperature 150~220° C.). For comparison, a $H_2TiO_3$ sample was synthesized using the method as reported below. Anatase type $TiO_2$ (15.0 g, Ti 0.187 mole) and $Li_2CO_3$ (13.9 g, 0.376 mole Li) were mixed, ground and heated in an alumina crucible at a rate of ca. 6° C. min-1 in air up to 700° C. and maintained at 700° C. for the next 4 hours. After cooling to room temperature, the solid powder ($Li_2TiO_3$) was treated with 0.2 mol $dm^3$ HCl solution with occasional shaking for 1 day at room temperature (1 g of solid in 1 $dm^3$ acid). The solid was separated by filtration, washed with deionized water until the filtrate was neutral and allowed to dry at room temperature to obtain the $H^2TiO^3$. The $H^2TiO^3$ thus produced was used as adsorbent to purify LiCl from a brine.

Example 3

Adsorption of Li from LiCl Brine

A weighed amount of LiCl containing brine (10 g) was transferred into a vessel, for example a column, containing 0.2 g of $H_2TiO_3$ adsorbent.

The adsorbent $H_2TiO_3$ was regenerated by the addition of HCl acid solution. 1.0 g of the lithium adsorbed sample (Li adsorbed at 32 mg $g^{-1}$) was treated with 100 g of 0.2 mol $dm^{-3}$ HCl solution for 24 hours at room temperature. Lithium was extracted completely (about 100%). To test the reusability of the regenerated sample, about 1.0 g of the acid treated material was treated with 50 g of brine containing $NaHCO_3$ for 24 hours.

The total amount of sodium, potassium, magnesium and calcium adsorbed from the brine was <0.30 mmol $g^{-1}$. The $H_2TiO_3$ was found capable of efficiently adsorbing lithium ions from the brine containing competitive cations such as sodium, potassium, magnesium and calcium in extremely large excess. The results indicate that the selectivity order $Li^+>>Na^+, K^+, Mg^{2+}, Ca^{2+}$ originates from a size effect. The $H_2TiO_3$ can be regenerated and reused for lithium exchange in the brine with an exchange capacity very similar to the original $H_2TiO_3$.

Example 4—Combined Series of Testing

Preparation of Brine Solutions

Two brines have been tested, a first high concentration brine and a second low concentration brine, having the following composition:

TABLE 1

| High Concentration Brine | |
|---|---|
| Compound | Mass (g) |
| $Na_2SO_4$ | 23.53 |
| $Na_2B_4O_7 \cdot 10H_2O$ | 3.81 |
| $NaHCO_3$ | 0.32 |
| NaCl | 210.43 |
| KCl | 45.11 |
| $MgCl_2 \cdot 6H_2O$ | 81.74 |
| $CaCl_2$ | 1.25 |
| LiCl | 9.62 |

TABLE 2

| Low Concentration Brine | |
|---|---|
| Compound | Mass (g) |
| $Na_2SO_4$ | 1.079 |
| $Na_2B_4O_7 \cdot 10H_2O$ | 0.239 |
| NaCl | 21.33 |
| KCl | 1.48 |
| $MgCl_2 \cdot 6H_2O$ | 1.564 |
| $CaCl_2$ | 0.235 |
| LiCl | 0.425 |

Bicarbonate ($NaHCO_3$) was used as the pH buffer to neutralise the released $H^+$ in the suspension during the sorption experiments. Specifically, the buffered brine solution was prepared by adding 25 g/L NaHCO3 to the aforementioned brine and adjusting the pH to ~6.5 with concentrated HCl.

For the high concentration brine, NaOH (1.0 mol dm-3) was added into the brine solution (volume ratio of NaOH/brine=0.12). The concentrated brine with adding NaOH precipitated a fine white solid upon the addition of NaOH and the white solid is believed to be NaCl. The brine was filtered through 0.45 µm membrane filter before use.

Sorption Experiments

The lithium adsorption data were collected by dispersing 0.50 g of adsorbent into 10 mL brine in a 50 mL centrifuge tube, and the suspensions were frequently mixed on a rotary mixer for 20~24 hours. After the reaction, the suspensions were filtered using a 0.45 µm syringe-driven membrane filter unit. The filtrates were analyzed for Li, Na, K, Mg, Ca and B by inductively coupled plasma atomic emission spectroscopy (ICP-OES).

Results

Na-titanate nanotubes/nanofibers were prepared by the hydrothermal reaction at several temperatures (150, 160, 170, 180, 200 and 220° C.), using a concentrated NaOH solution and $TiO_2$ powder. The as-prepared $Na_2Ti_3O_7X$ samples were then treated with diluted HCl solution to obtain $H_2Ti_3O_7X$ (X=hydrothermal temperature 150~220° C.).

When the hydrothermal temperatures were 150 and 160° C., the products are titanate nanotubes. When the hydrothermal temperature was above 170° C., titanate nanofibers were obtained.

Acid treatment of the Na-titanate converted the as-prepared samples to H-titanate. The replacement of the $Na^+$ ions with $H^+$ ions was ascribed to the smaller ionic radius of $H^+$ compared with $Na^+$. H-titanate crystallizes in a monoclinic system with a space group (C2/m) and a layered structure, this confirmed the formation of the H-titanate phase in the samples.

The hydrothermal temperature clearly had great effect on nanostructure formation. Dense nanotubes were obtained at lower temperatures (150 and 160° C.). Further increase in the reaction temperature resulted in the formation of remarkably long clear fibres. It was also observed that the degree of crystallinity of these fibres increases with increasing hydrothermal temperature as determined by XRD. At a lower hydrothermal temperature, the diffraction peaks in the XRD pattern are broader, reflecting a poorer crystallinity of the sample prepared at a lower temperature.

The H-titanate nanotubes/fibers of a high purity were obtained after the 0.05 M HCl acid treatment. Neutralisation with the dilute acid solution yielded H-titanate nanofibers that retained the fibril morphology. The acid treatment step did not alter the architecture of the nanomaterials with the tubes/fibres retaining similar dimensions and morphology as the untreated samples.

The diameter of the $TiO_2$ particles as received is around 100~200 nm, as determined by TEM. After the hydrothermal reaction, the $TiO_2$ particle morphology is changed. The long tubes/fibres are well crystallised of layered Na-titanate according to TEM.

Adsorption tests were conducted at room temperature with 0.5 g/10 mL of adsorbent in brine. A series of adsorbents were trialled with two kinds of brines with different concentrations: pristine $TiO_2$, $H_2Ti_3O_7150$, $H_2Ti_3O_7160$, $H_2Ti_3O_7170$, $H_2Ti_3O_7180$, $H_2Ti_3O_7200$, $H_2Ti_3O_7220$, $Na_2Ti_3O_7150$, $Na_2Ti_3O_7160$, $Na_2Ti_3O_7170$, $Na_2Ti_3O_7180$, $Na_2Ti_3O_7200$, and $Na_2Ti_3O_7220$. The suffix for each of these adsorbents indicates the temperature at which each was prepared.

It is reported that the adsorption of lithium from the unbuffered brine was almost ineffective (CSIRO report), we also buffered the brine solution with $NaHCO_3$ or NaOH as the buffer. The brine solutions used in the present study were labelled as Bx (x=1~10).

First, the 1.0 g of as-received $TiO_2$ sample was used with the 10 mL of low concentration brine to test its activity, and the pristine $TiO_2$ exhibited very poor adsorption ability (0.19 mg/g).

H-titanate Adsorbent Testing

Adsorption experiments were conducted with H-titanate adsorbents using the synthesised high concentration brine. Due to the relevant high concentration of various ions in this solution, it was diluted 10 times, and then $NaHCO_3$ (25 g/L) added as a buffer. The pH value was adjusted to 6.5 with concentrated HCl.

The results shown in Tables 3 to 6 below are the detailed adsorption results for the diluted concentrated brine during two periods of time (22 and 45 hours).

TABLE 3

Adsorption from buffered concentrated brine solution with 0.5 g adsorbent after 22 hours

| $NaHCO_3$ buffered diluted high conc brine (×10) | | | Element concentration (mg/L) | | | | | | |
|---|---|---|---|---|---|---|---|---|---|
| Sample | Adsorbent | pH | Li | B | Ca | K | Mg | Na | S |
| B5 | N/A | 7.5 | 158.5 | 45.67 | 47 | 2415 | 931 | 15750 | 631.3 |
| 49 | $H_2Ti_3O_7150$ | 7.9 | 123.0 | 39.63 | 2.897 | 1703 | 717 | 14600 | 607.6 |
| 50 | $H_2Ti_3O_7160$ | 7.9 | 123.9 | 39.56 | 2.981 | 1716 | 721.6 | 14530 | 604.2 |
| 51 | $H_2Ti_3O_7170$ | 7.9 | 117.2 | 42.73 | 6.84 | 1749 | 827.9 | 14430 | 607.2 |
| 52 | $H_2Ti_3O_7180$ | 8.0 | 117.2 | 43.83 | 11.02 | 1770 | 872.6 | 14620 | 603.4 |
| 53 | $H_2Ti_3O_7200$ | 8.0 | 117.3 | 43.86 | 13.03 | 1838 | 891.4 | 14350 | 612.5 |
| 54 | $H_2Ti_3O_7220$ | 8.0 | 106.1 | 44.3 | 14.82 | 1946 | 918.3 | 14720 | 606.4 |

TABLE 4

Element uptake from buffered concentrated brine solution with 0.5 g adsorbent after 22 hours

| $NaHCO_3$ buffered diluted high conc brine (×10) | | Element uptake (mg/g) | | | | | | |
|---|---|---|---|---|---|---|---|---|
| Sample | Adsorbent | Li | B | Ca | K | Mg | Na | S |
| B5 | N/A | N/A | N/A | N/A | N/A | N/A | N/A | N/A |
| 49 | $H_2Ti_3O_7150$ | 0.71 | 0.12 | 0.88 | 14.24 | 4.28 | 23 | 0.47 |
| 50 | $H_2Ti_3O_7160$ | 0.70 | 0.12 | 0.88 | 13.98 | 4.188 | 24.4 | 0.54 |
| 51 | $H_2Ti_3O_7170$ | 0.83 | 0.06 | 0.80 | 13.32 | 2.062 | 26.4 | 0.48 |
| 52 | $H_2Ti_3O_7180$ | 0.83 | 0.04 | 0.72 | 12.9 | 1.168 | 22.6 | 0.56 |
| 53 | $H_2Ti_3O_7200$ | 0.83 | 0.04 | 0.68 | 11.54 | 0.792 | 28 | 0.38 |
| 54 | $H_2Ti_3O_7220$ | 1.05 | 0.03 | 0.64 | 9.38 | 0.254 | 20.6 | 0.50 |

TABLE 5

Adsorption from buffered concentrated brine solution with 0.5 g adsorbent after 45 hours

| NaHCO$_3$ buffered diluted high conc brine (×10) | | | Element concentration (mg/L) | | | | | | |
|---|---|---|---|---|---|---|---|---|---|
| Sample | Adsorbent | pH | Li | B | Ca | K | Mg | Na | S |
| B5 | N/A | 7.5 | 158.5 | 45.67 | 47 | 2415 | 931 | 15750 | 631.3 |
| 61 | H$_2$Ti$_3$O$_7$150 | 7.7 | 115.4 | 40.64 | 1.732 | 1649 | 678.8 | 14380 | 631.6 |
| 62 | H$_2$Ti$_3$O$_7$160 | 7.7 | 116.4 | 41 | 1.816 | 1675 | 683.4 | 14440 | 638.7 |
| 63 | H$_2$Ti$_3$O$_7$170 | 7.7 | 110.3 | 42.12 | 3.998 | 1682 | 804.9 | 14450 | 610.7 |
| 64 | H$_2$Ti$_3$O$_7$180 | 7.9 | 104.2 | 42.95 | 4.428 | 1636 | 849.7 | 14470 | 605.4 |
| 65 | H$_2$Ti$_3$O$_7$200 | 7.9 | 108 | 43.99 | 5.935 | 1731 | 891.3 | 14530 | 618 |
| 66 | H$_2$Ti$_3$O$_7$220 | 7.8 | 91.74 | 44.39 | 7.356 | 1813 | 891.5 | 14180 | 611.3 |

TABLE 6

Element uptake from buffered concentrated brine solution with 0.5 g adsorbent after 45 hours

| NaHCO$_3$ buffered diluted high conc brine (×10) | | Element uptake (mg/g) | | | | | | |
|---|---|---|---|---|---|---|---|---|
| Sample | Adsorbent | Li | B | Ca | K | Mg | Na | S |
| B5 | N/A | N/A | N/A | N/A | N/A | N/A | N/A | N/A |
| 61 | H$_2$Ti$_3$O$_7$150 | 0.86 | 0.10 | 0.91 | 15.32 | 5.04 | 27.40 | −0.01 |
| 62 | H$_2$Ti$_3$O$_7$160 | 0.84 | 0.09 | 0.90 | 14.80 | 4.95 | 26.20 | −0.15 |
| 63 | H$_2$Ti$_3$O$_7$170 | 0.96 | 0.07 | 0.86 | 14.66 | 2.52 | 26.00 | 0.41 |
| 64 | H$_2$Ti$_3$O$_7$180 | 1.09 | 0.05 | 0.85 | 15.58 | 1.63 | 25.60 | 0.52 |
| 65 | H$_2$Ti$_3$O$_7$200 | 1.01 | 0.03 | 0.82 | 13.68 | 0.79 | 24.40 | 0.23 |
| 66 | H$_2$Ti$_3$O$_7$220 | 1.34 | 0.03 | 0.79 | 12.04 | 0.79 | 31.40 | 0.40 |

From the adsorption results, H-titanate adsorbents (H$_2$Ti$_3$O$_7$X, X=150~220° C.) were effective for the extraction of lithium from brine. The hydrothermal temperature affects the adsorption results as increasing the temperature gave better adsorption ability. H$_2$Ti$_3$O$_7$220 can uptake 1.34 mg/g Li (~42%) from the diluted concentrated brine within 45 hours. The pH values of the brine solution increased slightly after the adsorption test.

The adsorption ability of the H-titanate adsorbents for the as prepared concentrated brine with high concentration was investigated. The concentrated brine was treated with 1.0 M NaOH solution. Typically, 100 mL of the as-prepared concentrated brine was treated with 10 mL of 1.0 M NaOH solution, the pH value was measured to be 8~9 after adding NaOH.

The adsorption test was conducted using H$_2$Ti$_3$O$_7$170 and H$_2$Ti$_3$O$_7$220 (0.5 g) for the NaOH treated concentrated brine, and all the other reaction conditions were kept identical. The results are listed in Tables 7 and 8 below:

TABLE 7

Adsorption from buffered concentrated brine solution with 0.5 g adsorbent after 22 hours

| NaOH buffered high conc Brine | | | Element concentration (mg/L) | | | | | | |
|---|---|---|---|---|---|---|---|---|---|
| Sample | Adsorbent | pH | Li | B | Ca | K | Mg | Na | S |
| B6 | N/A | 8.8 | 1823.5 | 191.3 | 2465.5 | 78773.1 | 2153.7 | 135970 | 4546.5 |
| 85 | H$_2$Ti$_3$O$_7$170 | 6.9 | 1448.5 | 357.7 | 1002.9 | 48066.3 | 2718.5 | 109390 | 5130.0 |
| 86 | H$_2$Ti$_3$O$_7$220 | 6.1 | 1667.5 | 332.9 | 1940.6 | 59492.5 | 2626.5 | 120530 | 5006.5 |

TABLE 8

Element uptake from buffered concentrated brine solution with 0.5 g adsorbent after 22 hours

| NaOH buffered high conc Brine | | Element uptake (mg/g) | | | | | | |
|---|---|---|---|---|---|---|---|---|
| Sample | Adsorbent | Li | B | Ca | K | Mg | Na | S |
| B6 | N/A | N/A | N/A | N/A | N/A | N/A | N/A | N/A |
| 85 | H$_2$Ti$_3$O$_7$170 | 7.50 | −3.33 | 29.25 | 614.13 | −11.30 | 531.6 | −11.67 |
| 86 | H$_2$Ti$_3$O$_7$220 | 3.12 | −2.83 | 10.50 | 385.61 | −9.45 | 308.8 | −9.20 |

The adsorption of lithium from the high concentration brine is significant, 20% or 7.50 mg/g using $H_2Ti_3O_7170$. This suggests that using higher concentration brine may obtain a better Li uptake.

To further investigate the effect of the brine concentration, we applied $H_2Ti_3O_7220$ as the adsorbent for both the NaHCO3 buffered diluted (×10) high concentration brine and NaOH buffered concentrated brine respectively. The results are given in Table 9. The adsorption of lithium from high concentration brine can reach 2.64 mg/g, while the result for the diluted brine is much lower (0.65 mg/g). It is noteworthy that the adsorbent also removes K from the brine solution significantly, especially for the case of NaOH treated high concentration brine.

The effects of the amount of adsorbents for both high and low concentration brines were studied. As seen from the results in Table 12 below, when the H?$Ti_3O_7220$ was used with the $NaHCO_3$ buffered low concentration brine, a change in the amount of adsorbent from 0.2~0.5 g did not produce a positive effect on the Li adsorption ability. Even 0.2 g adsorbent/10 mL brine gave 0.62 mg/g Li uptake. The results for the $NaHCO_3$ buffered diluted high concentration brine (×10) were much better due to the higher concentration, and 0.5 g adsorbent/10 mL brine gave the best performance (1.87 mg/g).

TABLE 9

Comparison of the adsorption ability of $H_2Ti_3O_7220$ for the $NaHCO_3$ buffered diluted (×10) concentrated brine and NaOH buffered concentrated brine, 0.4 g/5 mL, 22 hours

| Element | $NaHCO_3$ buffered diluted (×10) | | | NaOH buffered | | |
|---|---|---|---|---|---|---|
| | Li | Mg | K | Li | Mg | K |
| Feed C. (mg/L) | 203.8 | 447.0 | 13180.5 | 1823.5 | 2153.7 | 78773.1 |
| Final C. (mg/L) | 152.1 | 440.8 | 9058.6 | 1612.5 | 2381.3 | 62941.6 |
| Adsorption (%) | 25.4% | 1.4% | 31.3% | 11.6% | −10.6% | 20.1% |
| Adsorption (mg/g adsorbent) | 0.65 | 0.07 | 51.52 | 2.64 | −2.85 | 197.89 |

We also prepared a low concentration brine solution as described above, wherein the various ion concentrations are much lower compared with that of the high concentration brine. The results listed in Table 10 and 11 are the adsorption results conducted with the brine solution prepared as a low concentration brine solution. A similar trend was observed, being that increasing the hydrothermal temperature gave better adsorption ability, and the $H_2Ti_3O_7220$ can uptake 0.58 mg/g Li from the brine solution, which is much lower compared with using the high concentration brine.

TABLE 10

Adsorption from buffered low concentration brine solution with 0.5 g adsorbent after 22 hours

| $NaHCO_3$ buffered low conc brine | | | Element concentration (mg/L) | | | | | | |
|---|---|---|---|---|---|---|---|---|---|
| Sample | Adsorbent | pH | Li | B | Ca | K | Mg | Na | S |
| B3 | N/A | 8.6 | 75.1 | 41.4 | 40.7 | 448.0 | 277.3 | 15574.3 | 342.2 |
| 31 | $H_2Ti_3O_7170$ | 8.5 | 53.3 | 38.7 | 10.0 | 277.4 | 239.3 | 14994.3 | 353.8 |
| 32 | $H_2Ti_3O_7180$ | 8.7 | 48.6 | 39.4 | 10.7 | 257.1 | 247.0 | 14864.3 | 334.6 |
| 33 | $H_2Ti_3O_7220$ | 8.8 | 46.0 | 42.3 | 18.1 | 328.4 | 286.9 | 13994.3 | 357.1 |

TABLE 11

Element uptake from buffered low concentration brine solution with 0.5 g adsorbent after 22 hours

| $NaHCO_3$ buffered low conc brine | | Element uptake (mg/g) | | | | | | |
|---|---|---|---|---|---|---|---|---|
| Sample | Adsorbent | Li | B | Ca | K | Mg | Na | S |
| B3 | N/A | N/A | N/A | N/A | N/A | N/A | N/A | N/A |
| 31 | $H_2Ti_3O_7170$ | 0.44 | 0.05 | 0.62 | 3.41 | 0.76 | 11.60 | −0.23 |
| 32 | $H_2Ti_3O_7180$ | 0.53 | 0.04 | 0.60 | 3.81 | 0.61 | 14.20 | 0.15 |
| 33 | $H_2Ti_3O_7220$ | 0.58 | −0.02 | 0.45 | 2.39 | −0.20 | 31.60 | −0.30 |

TABLE 12

The effects of the amount of adsorbents ($H_2Ti_3O_7220$) for high and low concentration brine

| Sample | Adsorption conditions | Li uptake (mg/g) |
|---|---|---|
| 89 | 0.2 g $H_2Ti_3O_7220$/10 mL brine (low conc) | 0.62 |
| 90 | 0.3 g $H_2Ti_3O_7220$/10 mL brine (low conc) | 0.67 |
| 33 | 0.5 g $H_2Ti_3O_7220$/10 mL brine (low conc) | 0.58 |

TABLE 12-continued

The effects of the amount of adsorbents
($H_2Ti_3O_7$220) for high and low concentration brine

| Sample | Adsorption conditions | Li uptake (mg/g) |
|---|---|---|
| 91 | 0.2 g $H_2Ti_3O_7$220/10 mL brine (high conc) | 1.17 |
| 92 | 0.3 g $H_2Ti_3O_7$220/10 mL brine (high conc) | 1.08 |
| 54 | 0.5 g $H_2Ti_3O_7$220/10 mL brine (high conc) | 1.87 |

To compare these results with the reported H2TiO3 material, we also prepared the H2TiO3 using the same method as reported by Chitrakar et al., supra. We applied the as-prepared $H_2TiO_3$ with the identical reaction conditions (0.5 g adsorbent/10 mL brine) for the adsorption test for both $NaHCO_3$ buffered high and low concentration brine, and the results are listed in Table 13 below, and are a somewhat improved compared with $H_2Ti_3O_7$220 sample under identical conditions.

TABLE 13

The Li uptake from $NaHCO_3$ buffered high
and low concentration brine using $H_2TiO_3$

| Sample | Adsorption conditions | Li uptake (mg/g) |
|---|---|---|
| 101 | 0.5 g $H_2TiO_3$/10 mL (low conc brine) | 1.50 |
| 102 | 0.5 g $H_2TiO_3$/10 mL (high conc brine) | 3.74 |

Na-titanate Adsorbent Testing

The adsorption ability of the Na-titanate adsorbents was investigated using $Na_2Ti_3O_7$150~220 with $NaHCO_3$ buffered low concentration brine. The results are shown in Tables 14 and 15 below. Interestingly, the as-prepared Na-titanates without acid treatment also show lithium adsorption ability. The results gave an opposite trend compared with those of H-titanate, increasing the hydrothermal temperature gave poorer adsorption ability, and the $Na_2Ti_3O_7$150 prepared at lower temperature exhibited the best performance (1.40 mg/g).

TABLE 14

Adsorption from buffered low concentration brine
solution with 0.5 g adsorbent after 24 hours

| | | | Element concentration (mg/L) | | | | | | |
|---|---|---|---|---|---|---|---|---|---|
| NaHCO$_3$ buffered low conc brine | | | | | | | | | |
| Sample | Adsorbent | pH | Li | B | Ca | K | Mg | Na | S |
| B3 | N/A | 8.6 | 94.3 | 20.3 | 28.1 | 5224.8 | 87.7 | 18130 | 192.2 |
| 76 | $Na_2Ti_3O_7$150 | 8.7 | 24.1 | 19.6 | 3.3 | 687.0 | 9.1 | 14690 | 147.8 |
| 77 | $Na_2Ti_3O_7$160 | 8.4 | 30.7 | 19.6 | 1.9 | 701.4 | 24.8 | 14090 | 248.0 |
| 78 | $Na_2Ti_3O_7$170 | 8.9 | 42.7 | 23.4 | 0.8 | 961.6 | 33.0 | 14480 | 241.1 |
| 79 | $Na_2Ti_3O_7$180 | 8.9 | 43.2 | 24.3 | 1.3 | 1161.5 | 41.6 | 15450 | 246.0 |
| 80 | $Na_2Ti_3O_7$200 | 8.8 | 67.8 | 25.2 | 11.2 | 1600.3 | 107.1 | 15500 | 245.3 |
| 81 | $Na_2Ti_3O_7$220 | 9.1 | 68.8 | 24.8 | 15.8 | 1861.7 | 102.4 | 16080 | 242.0 |

TABLE 15

Element uptake from buffered low concentration brine
solution with 0.5 g adsorbent after 24 hours

| | | Element uptake (mg/g) | | | | | | |
|---|---|---|---|---|---|---|---|---|
| NaHCO$_3$ buffered low conc brine | | | | | | | | |
| Sample | Adsorbent | Li | B | Ca | K | Mg | Na | S |
| B3 | N/A | N/A | N/A | N/A | N/A | N/A | N/A | N/A |
| 76 | $Na_2Ti_3O_7$150 | 1.40 | 0.01 | 0.49 | 90.76 | 1.57 | 68.80 | −1.11 |
| 77 | $Na_2Ti_3O_7$160 | 1.27 | 0.01 | 0.52 | 90.47 | 1.26 | 80.80 | −1.11 |
| 78 | $Na_2Ti_3O_7$170 | 1.03 | −0.06 | 0.54 | 85.27 | 1.09 | 73.00 | −0.98 |
| 79 | $Na_2Ti_3O_7$180 | 1.02 | −0.08 | 0.53 | 81.27 | 0.92 | 53.60 | −1.08 |
| 80 | $Na_2Ti_3O_7$200 | 0.53 | −0.10 | 0.34 | 72.49 | −0.39 | 52.60 | −1.06 |
| 81 | $Na_2Ti_3O_7$220 | 0.51 | −0.09 | 0.25 | 67.26 | −0.29 | 41.00 | −1.00 |

These Na-titanate adsorbents were also tested for the as-prepared high concentration brine. As described above, the high concentration brine was treated with 1.0 M NaOH solution. Typically, 100 mL of the as-prepared high concentration brine was treated with 10 mL of 1.0 M NaOH solution, the pH value was measured to be 8~9 after adding NaOH.

The adsorption test was conducted using $Na_2Ti_3O_7$150~220 (0.5 g) for the 10 mL of NaOH treated high concentration brine, and all the other reaction conditions were kept identical. The results are listed in Tables 16 and 17 below:

TABLE 16

Adsorption from buffered high concentration brine
solution with 0.5 g adsorbent after 24 hours

| NaOH buffered high conc brine | | Element concentration (mg/L) | | | | | | |
|---|---|---|---|---|---|---|---|---|
| Sample | Adsorbent | pH | Li | B | Ca | K | Mg | Na | S |
| B7 | N/A | 8.8 | 841.8 | 266.9 | 353.5 | 19192.9 | 2963.0 | 72603.0 | 4922.2 |
| 119 | $Na_2Ti_3O_7$150 | 7.3 | 734.3 | 164.9 | 7.4 | 18862.9 | 2726.0 | 72943.0 | 4835.2 |
| 120 | $Na_2Ti_3O_7$160 | 7.1 | 762.6 | 170.5 | 5.1 | 18882.9 | 2786.0 | 74083.0 | 5037.2 |
| 121 | $Na_2Ti_3O_7$170 | 8.0 | 784.7 | 194.0 | 88.4 | 19092.9 | 2859.0 | 74763.0 | 5055.2 |
| 122 | $Na_2Ti_3O_7$180 | 8.2 | 805.4 | 199.9 | 189.5 | 18972.9 | 2813.0 | 75103.0 | 5022.2 |
| 123 | $Na_2Ti_3O_7$200 | 8.0 | 801.0 | 202.4 | 275.2 | 19132.9 | 2802.0 | 73363.0 | 4979.2 |
| 124 | $Na_2Ti_3O_7$220 | 8.2 | 817.5 | 205.3 | 286.7 | 18932.9 | 2831.0 | 73743.0 | 5030.2 |

TABLE 17

Element uptake from buffered high concentration brine
solution with 0.5 g adsorbent after 24 hours

| NaOH buffered high conc brine | | Element uptake (mg/g) | | | | | | |
|---|---|---|---|---|---|---|---|---|
| Sample | Adsorbent | Li | B | Ca | K | Mg | Na | S |
| B7 | N/A | N/A | N/A | N/A | N/A | N/A | N/A | N/A |
| 119 | $Na_2Ti_3O_7$150 | 2.15 | 2.04 | 6.92 | 6.6 | 4.74 | −6.8 | 1.74 |
| 120 | $Na_2Ti_3O_7$160 | 1.58 | 1.93 | 6.97 | 6.2 | 3.54 | −29.6 | −2.30 |
| 121 | $Na_2Ti_3O_7$170 | 1.14 | 1.46 | 5.30 | 2.0 | 2.08 | −43.2 | −2.66 |
| 122 | $Na_2Ti_3O_7$180 | 0.73 | 1.34 | 3.28 | 4.4 | 3.00 | −50 | −2.00 |
| 123 | $Na_2Ti_3O_7$200 | 0.82 | 1.29 | 1.57 | 1.2 | 3.22 | −15.2 | −1.14 |
| 124 | $Na_2Ti_3O_7$220 | 0.49 | 1.23 | 1.34 | 5.2 | 2.64 | −22.8 | −2.16 |

The Na-titanate adsorbents gave good Li adsorption ability for the buffered high concentration brine. Similarly, increasing the hydrothermal temperature gave better adsorption ability, and the $Na_2Ti_3O_7$150 exhibited the best performance (2.15 mg/g), while $Na_2Ti_3O_7$220 only provided a 0.49 mg/g Li adsorption.

To better under understand the adsorption ability for the high concentration brine, the $Na_2Ti_3O_7$150 (0.5 g) with the best performance was paired with three different concentrations of the high concentration brine—being original high concentration brine buffered with NaOH, original high concentration brine buffered with NaOH diluted 5 times (×5), and original high concentration brine buffered with NaOH diluted 10 times (×10). From the results in Table 18 and 19, it is apparent that the higher concentration of original high concentration brine still shows higher Li adsorption (1.99 mg/g). When diluted 10 times, the Li adsorption was reduced to 1.27 mg/g.

TABLE 18

Adsorption from buffered high concentration brine
solution with 0.5 g adsorbent after 24 hours

| NaOH buffered high conc brine | | Element concentration (mg/L) | | | | | | |
|---|---|---|---|---|---|---|---|---|
| Sample | Adsorbent | Li | B | Ca | K | Mg | Na | S |
| B7 | N/A | 841.8 | 266.9 | 353.5 | 19192.9 | 2963.0 | 72603.0 | 4922.2 |
| 129 | $Na_2Ti_3O_7$150 | 742.1 | 221.6 | 8.2 | 18492.9 | 2846.0 | 73593.0 | 4917.2 |
| B7x5 | N/A | 229.9 | 50.2 | 81.1 | 3949.9 | 1181.0 | 16673.0 | 1028.2 |
| 130 | $Na_2Ti_3O_7$150 | 155.9 | 32.9 | 0.3 | 3412.9 | 802.1 | 18323.0 | 1000.9 |
| B7x10 | N/A | 121.9 | 17.2 | 39.6 | 2074.9 | 636.6 | 8600.0 | 496.3 |
| 131 | $Na_2Ti_3O_7$150 | 58.4 | 7.4 | 0.4 | 1416.9 | 170.9 | 10283.0 | 484.2 |

TABLE 19

Element uptake from buffered high concentration brine
solution with 0.5 g adsorbent after 24 hours

| NaOH buffered high conc brine | | Element uptake (mg/g) | | | | | | |
|---|---|---|---|---|---|---|---|---|
| Sample | Adsorbent | Li | B | Ca | K | Mg | Na | S |
| B7 | N/A | N/A | N/A | N/A | N/A | N/A | N/A | N/A |
| 129 | $Na_2Ti_3O_7$150 | 1.99 | 0.91 | 6.91 | 14 | 2.34 | −19.80 | 0.10 |
| B7x5 | N/A | N/A | N/A | N/A | N/A | N/A | N/A | N/A |
| 130 | $Na_2Ti_3O_7$150 | 1.48 | 0.35 | 1.62 | 10.74 | 7.58 | −33.00 | 0.55 |

TABLE 19-continued

Element uptake from buffered high concentration brine solution with 0.5 g adsorbent after 24 hours

| NaOH buffered high conc brine | | Element uptake (mg/g) | | | | | | |
|---|---|---|---|---|---|---|---|---|
| Sample | Adsorbent | Li | B | Ca | K | Mg | Na | S |
| B7x10 | N/A | N/A | N/A | N/A | N/A | N/A | N/A | N/A |
| 131 | $Na_2Ti_3O_7$150 | 1.27 | 0.20 | 0.78 | 13.16 | 9.31 | −33.66 | 0.24 |

The trends apparent from the above results are that the absolute adsorption of Li increases with the concentration of brine becoming more dilute, whereas the adsorption amount of Li (mg/g) decreases with the concentration of brine becoming more dilute.

Whether the Na-titanate adsorbents could be an effective adsorbent when used with these brines without adding buffer like NaOH or NaHCO3 was also investigated. The as-prepared original low concentration brine and the high concentration brine (×10) without any further treatment for the adsorption test. The results are listed in Tables 20 to 23 below:

TABLE 20

Adsorption from high concentration brine solution with 0.5 g adsorbent after 24 hours

| Unbuffered Low conc brine | | | Element concentration (mg/L) | | | | | | |
|---|---|---|---|---|---|---|---|---|---|
| Sample | Adsorbent | pH | Li | B | Ca | K | Mg | Na | S |
| B10 | N/A | 8.5 | 59.4 | 9.6 | 68.1 | 758.4 | 73.2 | 8754.0 | 240.3 |
| 103 | $Na_2Ti_3O_7$150 | 8.4 | 12.5 | 15.1 | 0.2 | 414.8 | 0.6 | 9833.0 | 258.8 |
| 104 | $Na_2Ti_3O_7$160 | 8.5 | 11.5 | 15.4 | 0.1 | 408.5 | 0.5 | 9693.0 | 254.2 |
| 105 | $Na_2Ti_3O_7$170 | 9.2 | 23.3 | 20.2 | 0.1 | 528.2 | 1.2 | 9090.0 | 238.9 |
| 106 | $Na_2Ti_3O_7$180 | 9.3 | 33.4 | 22.6 | 0.2 | 646.7 | 4.7 | 9853.5 | 249.3 |
| 107 | $Na_2Ti_3O_7$200 | 9.1 | 33.2 | 21.7 | 1.7 | 540.3 | 33.3 | 7423.0 | 227.4 |
| 108 | $Na_2Ti_3O_7$220 | 9.8 | 41.5 | 23.1 | 2.0 | 730.7 | 35.2 | 9391.0 | 259.5 |

TABLE 21

Element uptake from high concentration brine solution with 0.5 g adsorbent after 24 hours

| Unbuffered Low conc brine | | Element uptake (mg/g) | | | | | | |
|---|---|---|---|---|---|---|---|---|
| Sample | Adsorbent | Li | B | Ca | K | Mg | Na | S |
| B10 | N/A | N/A | N/A | N/A | N/A | N/A | N/A | N/A |
| 103 | $Na_2Ti_3O_7$150 | 0.94 | −0.11 | 1.36 | 6.87 | 1.45 | −21.58 | −0.37 |
| 104 | $Na_2Ti_3O_7$160 | 0.96 | −0.11 | 1.36 | 7.00 | 1.45 | −18.78 | −0.28 |
| 105 | $Na_2Ti_3O_7$170 | 0.72 | −0.21 | 1.36 | 4.60 | 1.44 | −6.72 | 0.03 |
| 106 | $Na_2Ti_3O_7$180 | 0.52 | −0.26 | 1.36 | 2.23 | 1.37 | −21.99 | −0.18 |
| 107 | $Na_2Ti_3O_7$200 | 0.52 | −0.24 | 1.33 | 4.36 | 0.80 | 26.62 | 0.26 |
| 108 | $Na_2Ti_3O_7$220 | 0.36 | −0.27 | 1.32 | 0.55 | 0.76 | −12.74 | −0.38 |

TABLE 22

Adsorption from 10 times diluted high concentration brine solution with 0.5 g adsorbent after 24 hours

| Unbuffered High conc brine (×10) | | | Element concentration (mg/L) | | | | | | |
|---|---|---|---|---|---|---|---|---|---|
| Sample | Adsorbent | pH | Li | B | Ca | K | Mg | Na | S |
| B9 | N/A | 8.8 | 126.8 | 25.3 | 41.0 | 2088.9 | 703.8 | 8736.0 | 507.6 |
| 109 | $Na_2Ti_3O_7$150 | 7.9 | 59.6 | 21.9 | 1.7 | 1331.9 | 209.7 | 9733.0 | 486.4 |
| 110 | $Na_2Ti_3O_7$160 | 7.9 | 62.5 | 22.2 | 0.3 | 1397.9 | 225.4 | 10027.0 | 481.7 |
| 111 | $Na_2Ti_3O_7$170 | 9.1 | 71.8 | 28.1 | 0.5 | 1646.9 | 384.1 | 9439.0 | 496.2 |
| 112 | $Na_2Ti_3O_7$180 | 9.2 | 75.3 | 29.9 | 0.4 | 1759.9 | 467.9 | 9524.0 | 501.2 |
| 113 | $Na_2Ti_3O_7$200 | 9.3 | 96.5 | 32.8 | 2.0 | 1963.9 | 617.8 | 8861.0 | 509.4 |
| 114 | $Na_2Ti_3O_7$220 | 9.3 | 93.9 | 29.8 | 4.0 | 1937.9 | 609.2 | 8502.0 | 481.2 |

TABLE 23

Element uptake from 10 times diluted high concentration brine solution with 0.5 g adsorbent after 24 hours

| Unbuffered High conc brine (×10) | | Element uptake (mg/g) | | | | | | |
|---|---|---|---|---|---|---|---|---|
| Sample | Adsorbent | Li | B | Ca | K | Mg | Na | S |
| B9 | N/A | N/A | N/A | N/A | N/A | N/A | N/A | N/A |
| 109 | $Na_2Ti_3O_7$ 150 | 1.34 | 0.07 | 0.79 | 15.14 | 9.88 | −19.94 | 0.42 |
| 110 | $Na_2Ti_3O_7$ 160 | 1.29 | 0.06 | 0.81 | 13.82 | 9.57 | −25.82 | 0.52 |
| 111 | $Na_2Ti_3O_7$ 170 | 1.10 | −0.06 | 0.81 | 8.84 | 6.39 | −14.06 | 0.23 |
| 112 | $Na_2Ti_3O_7$ 180 | 1.03 | −0.09 | 0.81 | 6.58 | 4.72 | −15.76 | 0.13 |
| 113 | $Na_2Ti_3O_7$ 200 | 0.61 | −0.15 | 0.78 | 2.50 | 1.72 | −2.50 | −0.04 |
| 114 | $Na_2Ti_3O_7$ 220 | 0.66 | −0.09 | 0.74 | 3.02 | 1.89 | 4.68 | 0.53 |

From the above it is apparent that Na-titanate adsorbents are also very effective for the brines without adding any buffer, although the adsorption amount is a little lower than the results with buffered brine listed in Tables 14 to 17 above.

The absolute adsorption with the $Na_2Ti_3O_7$ 150 adsorbent is much higher for both solutions. For example, for the unbuffered low concentration brine solution, the Li amount was reduced from 59.4 mg/L to 12.5 mg/L after adsorption, removing 79% of Li. For the unbuffered high concentration brine (×10), the Li amount was reduced from 126.8 mg/L to 59.6 mg/L after adsorption, removing 53% of Li.

Comparison of Hydrated Titanium Dioxide and Na-Titanate Adsorbents

Three groups of comparison experiments were conducted using unbuffered brine under identical conditions (refer Tables 24 to 29 below) so as to compare the performance of $H_2TiO_3$ and $Na_2Ti_3O_7$ adsorbents.

TABLE 24

Adsorption from unbuffered low concentration brine solution (10 mL) with 0.5 g adsorbent after 24 hours

| Unbuffered Low conc brine | | Element concentration (mg/L) | | | | | | |
|---|---|---|---|---|---|---|---|---|
| Sample | Adsorbent | Li | B | Ca | K | Mg | Na | S |
| B10 | N/A | 76 | 34 | 115 | 1747 | 90 | 4526 | 248 |
| 138 | $H_2TiO_3$ | 73 | 32 | 104 | 1531 | 90 | 4482 | 252 |
| 139 | $Na_2Ti_3O_7$ 150 | 19 | 21 | 0 | 977 | 1 | 4989 | 245 |

TABLE 25

Element uptake from unbuffered low concentration brine solution (10 mL) with 0.5 g adsorbent after 24 hours

| Unbuffered Low conc brine | | Element uptake (mg/g) | | | | | | |
|---|---|---|---|---|---|---|---|---|
| Sample | Adsorbent | Li | B | Ca | K | Mg | Na | S |
| B10 | N/A | N/A | N/A | N/A | N/A | N/A | N/A | N/A |
| 138 | $H_2TiO_3$ | 0.06 | 0.05 | 0.21 | 4.33 | 0 | 0.87 | −0.09 |
| 139 | $Na_2Ti_3O_7$ 150 | 1.14 | 0.27 | 2.29 | 15.39 | 1.78 | −9.27 | 0.05 |

TABLE 26

Adsorption from unbuffered high concentration brine (×10) solution (10 mL) with 0.5 g adsorbent after 24 hours

| Unbuffered High conc brine (×10) | | Element concentration (mg/L) | | | | | | |
|---|---|---|---|---|---|---|---|---|
| Sample | Adsorbent | Li | B | Ca | K | Mg | Na | S |
| B9 | N/A | 152 | 51 | 63 | 3990 | 861 | 4237 | 517 |
| 140 | $H_2TiO_3$ | 145 | 44 | 53 | 4230 | 860 | 4317 | 511 |
| 141 | $Na_2Ti_3O_7$ 150 | 83 | 35 | 0 | 3246 | 266 | 5473 | 506 |

TABLE 27

Element uptake from unbuffered high concentration brine (×10) solution (10 mL) with 0.5 g adsorbent after 24 hours

| Unbuffered High conc brine (×10) | | Element uptake (mg/g) | | | | | | |
|---|---|---|---|---|---|---|---|---|
| Sample | Adsorbent | Li | B | Ca | K | Mg | Na | S |
| B9 | N/A | N/A | N/A | N/A | N/A | N/A | N/A | N/A |
| 140 | $H_2TiO_3$ | 0.15 | 0.14 | 0.20 | −4.80 | 0.03 | −1.60 | 0.12 |
| 141 | $Na_2Ti_3O_7$ 150 | 1.39 | 0.32 | 1.25 | 14.87 | 11.91 | −24.73 | 0.22 |

TABLE 28

Adsorption from unbuffered original high concentration brine solution (10 mL) with 0.5 g adsorbent after 24 hours

| Unbuffered High conc brine (×10) | | Element concentration (mg/L) | | | | | | |
|---|---|---|---|---|---|---|---|---|
| Sample | Adsorbent | Li | B | Ca | K | Mg | Na | S |
| B9 | N/A | 2039 | 495 | 547 | 44137 | 8761 | 76223 | 6731 |
| 140 | $H_2TiO_3$ | 1823 | 478 | 526 | 44682 | 8834 | 77482 | 6436 |
| 141 | $Na_2Ti_3O_7$150 | 1802 | 406 | 10 | 44770 | 8389 | 78111 | 6500 |

TABLE 29

Element uptake from unbuffered original high concentration brine solution (10 mL) with 0.5 g adsorbent after 24 hours

| Unbuffered High conc brine (×10) | | Element uptake (mg/g) | | | | | | |
|---|---|---|---|---|---|---|---|---|
| Sample | Adsorbent | Li | B | Ca | K | Mg | Na | S |
| B9 | N/A | N/A | N/A | N/A | N/A | N/A | N/A | N/A |
| 140 | $H_2TiO_3$ | 4.32 | 0.34 | 0.42 | −10.91 | −1.47 | −25.17 | 5.89 |
| 141 | $Na_2Ti_3O_7$150 | 4.73 | 1.79 | 10.74 | −12.67 | 7.44 | −37.75 | 4.61 |

From the above results the $Na_2Ti_3O_7$ adsorbent is particularly effective compared with $H_2TiO_3$ when used with unbuffered brine. For the unbuffered low concentration brine, $Na_2Ti_3O_7$150 adsorbent can uptake 75% Li, while $H_2TiO_3$ is almost ineffective.

However, for the very high concentration brine (Tables 28 and 29), it is relevant to note that $H_2TiO_3$ also shows good Li adsorption capability (4.32 mg/g), even though still lower than that of the $Na_2Ti_3O_7$ adsorbent (4.73 mg/g).

Separation of Adsorbents After Adsorption

The nanotube/fibre adsorbents described above are readily separated from the brine solution after the sorption by filtration, sedimentation, or centrifugation because of their fibril morphology. The Applicants expect this will significantly reduce the cost of the separation of the adsorbent from the liquid. The nanotubes/fibres in brine suspension sediment rapidly, in about 2 minutes, and the supernatant became very clear after 20 min for the $Na_2Ti_3O_7$150 sample, while it may take much longer time for the $H_2TiO_3$ sample to be precipitated. The titanate nanotube/fibre adsorbents described have an apparent advantage in the liquid-solid separation after the sorption procedure.

As can be seen with reference to the above description, both Na-titanate and H-titanate adsorbents were found to be effective. The adsorption ability appears to be dependent on the hydrothermal temperature of the titanate samples. $H_2Ti_3O_7$220 and $Na_2Ti_3O_7$150 exhibit the best Li adsorption performance. The adsorption amount also depends on the concentration of the brine, the higher concentration brine solution gave higher absolute adsorption amount. The best adsorption of lithium from the high concentration brine buffered with NaOH was obtained, with 20% or 7.50 mg/g Li adsorption using $H_2Ti_3O_7$170 nanofibers.

The titanate adsorbents described have been able to extract Li from unbuffered systems. The Na-titanate adsorbents are very effective for brines without the addition of buffer. It is envisaged that this will be of significant benefit in a reduction in cost of materials and equipment. It should also be noted that the absolute adsorption with the $Na_2Ti_3O_7$150 adsorbent is much higher: for the unbuffered low concentration brine solution, the Li amount was reduced from 59.4 mg/L to 12.5 mg/L after adsorption, removing 79% of Li; and for the unbuffered high concentration brine (×10), the Li amount was reduced from 126.8 mg/L to 59.6 mg/L after adsorption, removing 53% of Li.

A further advantage is realised in that the nanotube/fibre adsorbents of the present invention can be readily separated from a liquid after the sorption by filtration, sedimentation, or centrifugation because of their fibril morphology. It is expected that this will significantly reduce the cost of separation of the adsorbent from the liquid.

Again with reference to the above description, the present invention provides an improved extraction method for the extraction of lithium from a LiCl containing brine. Preferred processes according to the present invention are envisaged as being able to meet the needs and demands of today's lithium ion battery industry. Preferred processes according to the present invention specifically provide a method of reducing the contaminant impurities in the brine to less than 20 ppm.

Modifications and variations such as would be apparent to the skilled addressee are considered to fall within the scope of the present invention.

The invention claimed is:

1. A process for extraction of lithium from a brine, wherein a solution of the brine is contacted with a sodium titanate adsorbent, such that lithium ions are adsorbed thereon whilst rejecting substantially all other cations, the adsorbent being regenerated through addition of a hydrochloric acid solution whereby the adsorbed lithium ions are extracted, thereby producing a substantially pure lithium chloride solution.

2. The process of claim 1, wherein the brine solution is unbuffered when contacted with the sodium titanate adsorbent.

3. The process of claim 1, wherein the brine contains impurities from the group of sodium, potassium, magnesium, calcium and borate.

4. The process of claim 2, wherein the impurity concentration of the substantially pure lithium chloride solution does not exceed about 20 ppm.

5. The process of claim 1, wherein the brine contains lithium in the range of about 500 to 1500 ppm, and impurities including magnesium in the range of about 0.15% to 0.30%, calcium in the range of about 0.05% to 0.1%, sodium in the range of about 8 to 10%, potassium in the range of about 0.7% to 1.0%, and borate in the range of about 0.15% to 0.20%.

6. The process of claim 5, wherein the brine contains about 700 ppm lithium, about 0.19% magnesium, about 0.09% calcium, about 8.8% sodium, about 0.8% potassium and about 0.18% borate.

7. The process of claim 1, wherein the brine solution is adjusted to a pH of 7 through the addition of a base.

8. The process of claim 7, wherein the base is provided in the form of sodium hydroxide.

9. The process of claim 1, wherein the contact between the brine solution and the adsorbent takes place at or about room or ambient temperature.

10. The process of claim 9, wherein the brine is collected into a vessel and cooled to room temperature prior to its exposure to the adsorbent.

11. The process of claim 1, wherein the contact or residence time between the brine solution and the adsorbent is between about 4 to 24 hours.

12. The process of claim 11, wherein the contact or residence time between the brine solution and the adsorbent is:
   a. between about 8 to 24 hours;
   b. between about 20 to 24 hours; or
   c. between about 8 to 16 hours.

13. The process of claim 1, wherein an amount of lithium extracted from the adsorbent through exposure to the hydrochloric acid solution is greater than about 90% of an initial amount.

14. The process of claim 13, wherein the amount of lithium extracted from the adsorbent through exposure to the acid solution is about 100% of the adsorbed lithium.

15. The process of claim 1, wherein the substantially pure lithium chloride solution produced is suitable for use in high purity applications.

* * * * *